United States Patent
Clay

(10) Patent No.: US 10,238,126 B2
(45) Date of Patent: *Mar. 26, 2019

(54) FRYING TECHNOLOGY

(71) Applicant: OIL PRESERVATION TECHNOLOGIES LTD, East Yorkshire (GB)

(72) Inventor: Andrew J. Clay, West Yorkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/505,407

(22) PCT Filed: Aug. 24, 2015

(86) PCT No.: PCT/GB2015/052443
§ 371 (c)(1),
(2) Date: Feb. 21, 2017

(87) PCT Pub. No.: WO2016/027108
PCT Pub. Date: Feb. 25, 2016

(65) Prior Publication Data
US 2017/0265491 A1    Sep. 21, 2017

(30) Foreign Application Priority Data

Aug. 22, 2014  (GB) .................................. 1414987.6

(51) Int. Cl.
*A23L 1/015* (2006.01)
*A23D 9/06* (2006.01)
*A23D 9/007* (2006.01)
*C11B 5/00* (2006.01)

(52) U.S. Cl.
CPC ............... *A23D 9/06* (2013.01); *A23D 9/007* (2013.01); *C11B 5/0092* (2013.01)

(58) Field of Classification Search
CPC ......... A23D 9/06; A23D 9/007; C11B 5/0092

USPC .......... 426/74, 329, 423, 438, 521, 271, 601
See application file for complete search history.

(56) References Cited

U.S. PATENT DOCUMENTS

2013/0112607 A1*   5/2013   Bratton et al.

OTHER PUBLICATIONS

Naus, D. J., "The Effect of Elevated Temperature on Concrete Materials and Structures—A Literature Review," Oak Ridge National Laboratory, Oak Ridge Tennessee (Nov. 2005).
Hager, "Behaviour of cement concrete at high temperature" Bulletin of the Polish Academy of Sciences, Technical Sciences, vol. 61, No. 1 (2013).

* cited by examiner

*Primary Examiner* — Helen F Heggestad
(74) *Attorney, Agent, or Firm* — Edwin D. Schindler

(57) ABSTRACT

A method for preserving cooking oil comprises contacting the oil with oil-permeable cementious material in the form of either stand-alone blocks, pellets, granules, or balls and which has been hydraulically hardened from a paste comprising (a) >50 wt % of (i) white OPC clinker, (ii) white OPC or (iii) a mixture of white OPC clinker and white OPC, and (b) optionally further ingredients selected from silica, titania, lime, calcium sulphate, hydrated alumina, natural feldspars, diatomaceous earth, Na and Ca forms of natural and synthetic zeolites, clays, pillared clays, activated clays/earths, silicate minerals selected from calcium silicate, magnesium silicate, aluminum silicate, agalmatolite, amphiboles, attapulgite, granite porphyry, kaolinite, porphyry, rhyolite, talc and wollastonite, wherein the porosity of the cementious material is 30-55%. The oil-permeable cementious material has during manufacture been subjected to prolonged drying at elevated temperatures so as to reduce the amount of foaming occurring in the oil during treatment with the said cementious material.

20 Claims, No Drawings

FRYING TECHNOLOGY

CROSS-REFERENCE TO RELATED PATENT APPLICATIONS

This application is a U.S. National Phase Application under 35 U.S.C. § 371 of International Patent Application No. PCT/GB2015/052443, filed Aug. 24, 2015, and claims the priority of Great Britain Application No. 1414987.6, filed Aug. 22, 2014, all of which are incorporated by reference in their entireties. The International Application was published on Feb. 25, 2016 as International Publication No. WO 2016/027108 A1.

FIELD OF THE INVENTION

This invention relates to improvements in technology relating to methods for the treatment of cooking oils and fats.

INTERPRETATION

In this patent specification references to oils should be interpreted as being references to animal, vegetable, nut or synthetic oils and fats (which are generally solid at room temperatures). References to fryers herein should be taken as including any frying equipment, chamber, pan, tank, commercial, domestic or industrial fryer.

BACKGROUND TO THE INVENTION

Deep fat frying has become one of the most popular methods of cooking in domestic, restaurant and industrial establishments throughout the World. Because of the high temperatures involved (typically 160 to 200° C.) it is relatively quick, cooks food right through to the middle, generates a distinctive crust on the food and perhaps most importantly produces rich and complex flavours and food textures, which are very appealing to the consumer.

Frying, whether carried out in oils or fats, however also has a number of well-known disadvantages.

Cooking oil is expensive: high end olive oils are more expensive per liter than petrol or diesel and the price of even lower end cooking oils is comparable to that of petrol or diesel. Cooking oils have to be replaced frequently as the oils degrade during the cooking process, as more fully explained hereinafter. Also cooking oils (and their breakdown products) are absorbed by the food cooked in them which therefore necessitates the operator of a fryer to regularly keep the oil or fat topped up by the addition of extra cooking oil or fat. Cooking in oil therefore comes at a relatively high price compared to boiling in water or roasting in air.

The frequent changing of cooking oil in kitchens, restaurants and industrial sites where food items are manufactured is also a labour intensive and laborious task, which is costly and increases equipment down-time.

Unfortunately it is not possible to extend the life of cooking oils and fats merely by filtering out food debris particles, which frequently accumulate within them. During use cooking oils and fats do not remain unaltered but begin to chemically breakdown. Cooking oils and fats are commonly referred to as triglycerides but are in fact triacylglycerols: i.e. triesters of glycerol (1, 2, 3 propanetriol, which is commonly referred to as glycerine) and three fatty acids. The fatty acids do not need to be of the same type and frequently are not. Common chain lengths for the fatty acids, as determined by gas liquid chromatography, are 12 to 24 carbon atoms with 16 and 18 being particularly favoured. The breakdown of such triglycerides is complex, dependent on numerous factors and is subject to numerous feedback effects but involves three well-understood basic mechanisms: oxidation, polymerisation and hydrolysis.

Oxidation

Oxidation occurs when air comes in contact with frying oil, (see for example Josephson and Lindsey 1987, Journal of Food Sciences, 52, 328 and Fischer and Muller 1991, Potato Research, 34, 159). Oxygen from the air reacts with the two unsaturated carbons at the double-bond via a free radical initiated reaction. The oxidation reaction is promoted by high cooking temperatures (typically 190° C. and above), the presence of metals (including in particular copper and iron) and the presentation to the air of a large surface area of the oil as well as exposure to UV light, which promotes free radical formation. Initially hydroperoxides are produced but these are unstable and at frying temperatures they rapidly break down (via e.g. fission, dehydration and free radical formation) to produce a wide array of secondary oxidation products including polymers, acids, alcohols, esters, aldehydes, methyl ketones, lactones, alcanes, aromatics and other hydrocarbons, (see Belitz and Grosch 1999, Food Chemistry, $2^{nd}$ edition, Springer-Verlag, Berlin, p. 211).

Some of these secondary oxidation products are volatile and give rise to both pleasant rich flavours but some are also associated with rancid and offensive flavours. For example only 0.08 ppm of pentane is sufficient to reliably produce rancidity, (Warner et al. (1974) Journal of Food Science, 39, 761). Non-volatile compounds, such as core aldehydes, remain in the oil and are absorbed by the food.

Polymerisation

When cooking oil breaks down, the resulting products form both volatile low boiling point and higher boiling point non-volatile compounds. The non-volatile higher boiling point compounds remain within the frying oil and readily polymerize at frying temperatures above 190° C. or in isolated hot spots within the fryer. Such polymerisation products can then bond together to form larger clusters, which can accumulate as an insoluble layer on the surface of the oil, thus preventing water vapour, evaporating from food cooking in the oil, escaping from the oil's surface and thereby producing dangerous foaming, which can lead to fires and personal injury of kitchen staff.

The presence of the impermeable polymer layer in turn promotes more hydrolysis in what can become a runway feed-back driven process. Polymerisation also leads to an increase in the viscosity of the oil which reduces its ability to effect heat transfer and promotes yet more polymerisation. The increase in viscosity also increases the amount of energy required to effect cooking and thus increases energy bills.

Hydrolysis

Hydrolysis is caused by the reaction of water (a weak nucleophile) with the ester linkage in the triacylglycerol molecule to produce initially a diaglyceride and a free fatty acid, which then further breakdown to produce various compounds including lactones or simply boil off, depending on chain length, saturation and other factors. The presence of free fatty acids is frequently associated with a characteristic rancid or acidic flavour.

The production of free fatty acids in cooking oils is additionally problematical for several reasons.

Firstly free fatty acids are one of the main constituents of smoke haze and are both a fire and a health hazard. The smoke point of an oil is the temperature, at which it is seen to start smoking under specified test conditions. The flashpoint of an oil is the temperature at which volatile products are produced in sufficient concentration and quantity to allow ignition. The fire point of an oil is the temperature at which the rate of production of volatile products is sufficiently high to support continuous combustion of the gases emerging from the surface of the oil.

High levels of free fatty acid in cooking oils are associated with reduced smoke, flash and fire points and are thus a significant fire hazard. For example Weiss (Food Oils and Their Uses, Wesport, The AVI Publishing Co. 1983) found that a free fatty acid composition of 0.04% was associated with a smoke point of 218° C., a flashpoint of 327° C. and a fire point of 366° C. whereas for the same oil increasing the free fatty acid content to just 1% percent lead to the smoke point decreasing to 160° C., the flashpoint decreasing to 307° C. and the fire point dropping to 360° C.

In addition to being a fire hazard, an increase in the concentration of free fatty acids (and their break down products) in cooking oils also has deleterious effects on the preparation of food cooked in such oils.

Fatty acids and some of their breakdown products, having both distinct hydrophobic and hydrophilic regions, act as effective surfactants. The effect of the concentration of surfactants in cooking oil on the properties of the food cooked in such oil is well-known (see e.g. Blumenthal M M. A new look at the chemistry and physics of deep fat frying: food technology, 1991, 45:2, 68-71, 94). When for example chips are cooked in fresh unused cooking oil they are light in colour and do not have the rich complex aromas associated with fried potatoes. The oil, during this "break in" phase has only low levels of surfactants (such as free fatty acids), which means that the oil has a relatively high surface tension which prevents the oil having close contact with the food. The heat from the oil is not effectively transferred across the oil/wet-food barrier and the food is in part boiled rather than fried as the steam emerging from the food pushes a substantial amount of the oil away from its surface. As the oil is used further the amount of free fatty acid and other surfactants increases resulting in improved food quality. During the so-called optimum phase chips cooked in the oil are golden brown in colour and have a significant crust but with relatively low levels of oil being absorbed by the food, which is cooked through to the centre. For example fresh French fries will typically consist of about 10% by weight of oil, when cooking during the so called optimum phase. However as the oil is subject to both further hydrolysis and oxidation, the increase in free fatty acids and other surfactants decreases the surface tension significantly and ensures that the oil can rapidly bridge the otherwise immiscible oil food barrier. This results in the surface of, for example, chips having a characteristic dark and spotted appearance. Excessive contact with the oil rapidly dries the surface region of the food thus trapping moisture deeper in the food and inhibiting heat penetration deeper within the food's centre, which therefore typically is undercooked. The resulting greasy chip with an oil content by weight of typically in excess of about 20%, with a dark spotted exterior and undercooked centre, is familiar to many who have eaten at down market fast food establishments, which do not change their cooking oil often enough.

The absorption of excessive amounts of cooking oils by food cooked in the oil also very significantly increases the calorific value of the food, thus giving many consumers extra calories they do not need and promoting obesity and the numerous health problems associated with it including in particular type II diabetes.

Further the absorption of excessive amounts of cooking oil by food has other important consequences for health. Hydrogenated vegetable oils and fats are widely used in cooking due mainly to their increased stability, resistance to oxidation, longer shelf-life and their greatly increased resistance to rancidity.

However such oils contain increased amounts of transfatty acid side chains on the glycerol backbone, which are a material health hazard. After ingestion most of the initial digestion of cooking oils is accomplished in the stomach via specialist pancreatic enzymes (lipases) and bile secretions. The resultant fatty acids and glycerol are then absorbed by cells lining the intestines called enterocytes, where they are re-esterified into triglycerides and transported to the liver as chylomicrons. When the chylomicrons reach the liver, the fatty acids are repackaged into triacylglycerols and phosphatidylcholine and thence into lipoproteins.

High levels of trans fatty acids in the diet are associated with raised serum levels of low density lipoprotein (LDL) cholesterol and with lower levels of high density lipoprotein (HDL) cholesterol in humans. Raised serum LDL and reduced serum HDL levels are associated with coronary artery disease, increased risk of stroke and elevated blood pressure as they decrease the health of the endothelium, the cells lining the arteries of the body which are essential for good cardiovascular health. Studies in humans further demonstrate that trans fats increase inflammation in the body, a potent risk factor for cardiovascular disease, diabetes, and other diseases. Studies in primates have demonstrated that trans fats cause weight gain, especially increasing abdominal fat, which has the greatest metabolic consequences, and is associated with insulin resistance, a known precursor to type II diabetes.

For all these reasons the amount of trans-fatty acids absorbed in the diet should be kept at low levels. One way of achieving that is to reduce the amount of hydrogenated cooking oil absorbed by fried food.

Various ways have been suggested to prolong the useful life of cooking oils. Some of these involve the step of removing the cooking oil from the fryer, followed by the step of subjecting it to one or more treatment methods to remove the contaminants before finally returning the treated oil back to the fryer. Other methods provide for at least the complete cessation of the cooking process, treatment and then the recommencement of the use of the oil.

Oil Removal and Treatment Methods

U.S. Pat. No. 4,112,129 (Duensing et al., Johns Manville) discloses a method of filtering the cooking oil through a composition comprising by weight (i) 47 to 59 parts diatomite, (ii) 28 to 36 parts synthetic calcium silicate hydrate and (iii) 12 to 24 parts synthetic magnesium silicate hydrate.

U.S. Pat. No. 4,681,768A (Mulflur W Jospeh et al) discloses a method for the continuous treatment of cooking oil with a filter made from synthetic calcium silicate. The method involves removal of the oil from the fryer, passing it through the filter and then passing it back into the fryer.

GB 2006729 (Johns Manville) discloses a method for filtering used cooking oils to remove free fatty acids, which uses synthetic calcium silicate but does not disclose an in situ solution suitable for unadapted fryers.

U.S. Pat. No. 5,870,945 discloses a filter cartridge for fitting to a fryer, which includes a mesh housing for containing filtering material which is used to treat the cooking oil outside the fryer prior to its return to the fryer.

U.S. Pat. No. 4,112,129A discloses a method for extending the life of cooking oil by removing free fatty acids which involves treating the oil with a composition of synthetic calcium silicate hydrate and synthetic magnesium silicate hydrate. U.S. Pat. No. 4,112,129A states that the method can be used with conventional cooking oil treatment systems but does not disclose an in situ solution suitable for unadapted fryers which do not have a treatment system.

EP 0226413A discloses a filter container provided with a removable filter bag but which cannot be used during the cooking operation.

U.S. Pat. No. 6,210,732 discloses a method of extending the life of cooking oil by the use of a blend of finely milled citric acid and calcium silicate powder, which is added to the hot oil, left for a certain length of time and then removed by treatment. The U.S. Pat. No. 6,210,732 invention cannot be used during the cooking process.

WO 91/11914A discloses a still further treatment method for used cooking oils, which uses an amorphous silica and alumina composition, which is either added to the hot oil and then filtered out or put in a container which is permeable to the oil but not the treatment composition. The invention disclosed cannot be used during the cooking operation.

U.S. Pat. No. 4,330,564A discloses a method of treating used cooking oil with a composition including a porous carrier, water and a food compatible acid, with the resultant residue being removed by treatment. The invention disclosed cannot be used during the cooking operation.

U.S. Pat. No. 3,947,602A discloses a method of treating cooking oil with a food compatible acid and a suitable adsorbent such as activated carbon. The invention disclosed cannot be used during the cooking operation.

U.S. Pat. No. 5,391,385A discloses the treatment of cooking oil with a mixture of 60-80% amorphous silica and 20 to 40% alumina, the mixture being placed in a permeable container which is then placed in the oil, the container being permeable to the oil but not to the mixture so that the adsorbent is not released into the oil and no treatment is required.

All the above treatment methods either require removal of the oil from the fryer and its treatment before reuse and/or cannot be carried out during the normal frying operation with standard frying equipment, which does not include in-line treatment equipment and a pump.

In Situ Treatment of Cooking Oil

Other methods are known for the treatment of cooking oil in the vessel where cooking takes place.

U.S. Pat. No. 4,764,384A discloses a method of treating used cooking oil with filtering media comprising synthetic amorphous silica, synthetic amorphous magnesium silicate and diatomaceous earth.

U.S. Pat. No. 5,354,570A discloses a method of frying food in cooking oils with a porous rhyolitic powder which selectively reduces the concentration of certain surfactants, whilst the cooking process is on-going.

JP 07-148073A discloses a method of treating cooking oil using finely pulverized zeolite stones which are inserted into a permeable bag which is itself placed into the fryer, with or without food also being present.

The above methods either require the addition of powders to the oil, which is undesirable as they may contaminate and change the texture and taste of any food cooked therein or require a further container to be added to the oil, which will often be problematical during use of the fryer due to space and other constraints.

The WO 2008/015481 and WO 2009/019512 Inventions

WO 2008/015481 and WO 2009/019512 ("the BBM Patents") (BBM Technology Limited) disclose the use of cementious hydraulically set filters made from ordinary Portland cement (OPC), white cement clinker and mixtures thereof, in the form of standalone briquettes, blocks, pellets, granules or balls, which do not substantially leach calcium or magnesium into cooking oils.

The BBM Patents disclose the use of such filters in cooking oils (a) in situ actually in the frying chamber where the food is being fried during the frying operation and also (b) prior to first use when the cooking oil is in a storage container. WO 2009/019512 additionally discloses the use of film or sheet packaging that resists the ingress of water or water vapour for wrapping the filters, after they have been dried to remove free water after hydraulic setting.

The use of such filters in a typical restaurant, fast food outlet or pub kitchen fryer has the advantage that it does not require existing frying equipment of the type typically found in such establishments to be modified, the filters just being put into the oil. No filtration systems or pumps are required for use with such fryers. Such filters can be used in situ in the oil during use and can prolong the life of the cooking oil so treated typically by up to 100 percent by removing free fatty acids, certain aldehydes and other polar compounds. They also reduce the amount of cooking oil absorbed by the food and thereby the amount of trans fatty acids digested, where the cooking oil contains trans fatty acid side chains, as many hydrogenated vegetable oils do).

However the use of the filters disclosed in the BBM Patents is associated with foaming in use. Foaming is not the same as mere bubbling, which is caused largely by evaporating water from the food. During foaming, water vapour produced during the food cooking process is trapped just below an impermeable layer at the top of the oil and cannot escape so that, as the volume of trapped water vapour increases, the oily impermeable layer of bubbles rises up the sides of the fryer and can bubble over, causing either injury, fire or damage to property as well as an unwelcome interruption to busy kitchen staff.

Without wishing to be bound by any particular theory, it is thought that foaming is caused by free fatty acids, produced during hydrolytic breakdown of the oil, reacting with calcium ions that originate from the filter so as to produce calcium fatty acid salts—i.e. soaps. Even very small amounts of calcium can cause foaming as the charged calcium ions are pushed to the surface of the oil, allowing their fatty acid tails to come into close contact and either polymerise with each other or other oil breakdown products or produce a weakly van der waal bonded monolayer. We have found that when the overall concentration of calcium in the body of the oil is below 2 ppm then the calcium concentration in the foam layer can be as high as 57 ppm, evidencing the concentration of calcium in the foam layer.

Foaming is encountered with the filters the subject of the BBM Patents particularly in cooking environments where a lot of hydrolysis takes place due to large amounts of wet food being cooked, for example frozen pre-cooked chips. Wet foods cause more hydrolysis which produces more free fatty acids. Foaming is not encountered on every single use of such filters but any occurrence of it is likely to lead to the filters being permanently rejected for use by the end user. Foaming is perceived as being potentially dangerous and also it often occurs during busy times in the restaurants, fast food outlets and pubs where such fryers are located with the result that those who have ordered food in such establishments frequently have unacceptable waits for their food as the foaming oil is drained from the fryer and replaced by fresh cool oil, which then has to be heated to the frying temperature.

In our previous patent application (GB 1322146.0) we disclosed a method for reducing foaming by at least partially enclosing or surrounding the treatment media with a foraminous barrier. In trials, treatment elements enclosed in such a foraminous box were put below the heating element of electric fryers and greatly reduced the instances of foaming as can be seen from the table below:—

TABLE 1

| Experiment No. in GB 1322146.0 | Number of instances of foaming | Percentage of trials during which foaming was observed |
|---|---|---|
| 1 | 3 out of 5 trials | 60% |
| 2 | 0 out of 5 trials | 0% |

TABLE 2

| | | no enclosures used | | |
|---|---|---|---|---|
| Energy source for fryer | Foaming establish- ments | Non- foaming establish- ments | % of establishments with this energy source which don't foam | % of establishments with this energy source which foam |
| Electricity | 8 | 12 | 60% | 40% |
| Gas | 14 | 6 | 30% | 70% |
| Total | 22 | 18 | | |

Table 2 shows the results obtained from more extensive trials carried out in an 18 L electric fryer and a 20 L gas fryer, with two filters put in each fryer but with no enclosure being used. The filters were placed either under the heating element or on a flat surface of the gas fryer near the well. All frying was carried out in KTC vegetable oil, which contains E900—PDMS anti-foaming agent. Frying was carried out on five successive days using 10 lots of chips (900 gms each) so that after all trials had been completed 45 kg of chips had been cooked in the fryers.

It will be noted that on 40% of the frying twenty frying trials with the electric fryers that foamed occurred. Foaming was on average seen on the fourth day of frying with the average occurrence being during the $36^{th}$ lot of frying on the fourth day, (SD+/−4.2 runs). It will be noted that 70% of the trials with the gas fryer foamed on average after the $23^{nd}$ run with a SD+/−6.1 runs. With the gas fryer there were a lot more occurrences of foaming on the second and third day of frying. The effect of using an enclosure on foaming is tabulated below in table 3.

TABLE 3

| | | enclosure used | | |
|---|---|---|---|---|
| Energy source for fryer | Foaming trials | Non- foaming trials | % of establishments with this energy source which don't foam | % of establishments with this energy source which foam |
| Electricity | 2 | 39 | 95% | 5% |
| Gas | 18 | 4 | 18% | 82% |
| Total | 20 | 43 | | |

It can be seen that the use of the foraminous enclosure reduced the incidence of foaming in electric fryers from 40% to less than 5% (2 occurrences in 41 frying runs). However it actually increased the incidence of foaming in gas fryers from 70% to 82%.

In our previous patent application (GB 1322146.0), we further disclosed a method for reducing foaming by the incorporation of microsilica into the mix, which due to its strong pozzolanic activity, accelerates the hydration reactions of the clinker phases (particularly alite). The fine microsilica particles fill the spaces between clinker grains thereby producing a denser paste and stronger overall cement and further reduces the amount of free calcium hydroxide produced by the hydration of alite and belite and promotes the production of calcium silicate hydrate gel. This reduction in free calcium hydroxide reduced the instance of foaming from 60% (3 out of 5 frying trials in example 1 of GB 1322146.0) to 20% (1 out 5 frying trials in example 4 of GB 1322146.0). However the use of microsilica did not completely eradicate the instances of foaming.

Thus, notwithstanding the invention disclosed in GB 1322146.0 there remains a pressing need for a method of reducing foaming still further in both electric fryers and gas fryers in particular.

SUMMARY OF THE INVENTION

According to one aspect of the current invention, there is provided a method of preserving cooking oil whilst at the same time reducing the extent of foaming, the method comprising providing in a cooking vessel a body of cooking oil, locating in said body of cooking oil a cementious filtering medium of the type described in the BBM Patents, which has been so treated during manufacturing that during use in said body of cooking oil it produces no or very much reduced foaming.

Accordingly, the invention provides a method of treating cooking oil during deep frying operations, which comprises the in situ treatment of the oil with a solid filter treatment material of the type described in the BBM Patents, which has been so treated during manufacturing that during said deep frying operations there is no or very much reduced foaming.

The invention further comprises a method of retarding the in situ formation of the break down products of the cooking process including in particular the breakdown products resulting from oxidation, hydrolysis and polymerisation (including in particular free fatty acids, aldehydes and other polar components) which comprises the in situ treatment of the oil with a solid filter treatment material of the type described in the BBM Patents, which has been so treated during manufacturing that during said deep frying operations there is no or very much reduced foaming.

By an essentially solid filter treatment material is meant to material having porosity so that oil can defuse into the body of material and will break down products can be deposited on within the body of the material or can react with the material so as to take them out of circulation within the cooking oil.

In a further aspect of the invention, there is provided a treatment material for retarding the in situ formation of free fatty acids and other cooking oil breakdown products, which comprises a cementious filtering material so treated that during the cooking oil treatment process no foaming is produced.

DESCRIPTION OF PREFERRED EMBODIMENTS

Fryers

The invention is applicable to the in situ treatment of cooking oil in deep fat fryers of the type used in restaurants, fast food outlets or in pubs which typically have a capacity for approximately 5-40 liters. It is also applicable to domestic deep fat fryers and for use in larger industrial fryers.

Materials

The treatment materials that are suitable for use in embodiments of this invention are those cementious materials that are disclosed in the specifications of the BBM Patents, which are incorporated herein in their entirety by reference. Particularly suitable treatment materials are cementious materials made substantially from pastes comprising (a) >50 wt % of (i) white OPC clinker or (ii) white OPC or (iii) a mixture of white OPC clinker and white OPC, and (b) optionally further ingredients selected from silica, titania, lime, calcium sulphate, hydrated alumina, natural feldspars, diatomaceous earth, Na and Ca forms of natural and synthetic zeolites, clays, pillared clays, activated clays/earths, silicate minerals selected from calcium silicate, magnesium silicate, aluminium silicate, agalmatolite, amphiboles, attapulgite, granite porphyry, kaolinite, porphyry, rhyolite, talc and wollastonite, wherein the porosity of the cementious material is 30-55%.

Such pastes advantageously also contain minor amounts of microsilica/silica fume and suitable air entraining agents, as hereinafter described.

Where clinker alone is used rather than a mixture of OPC and clinker then calcium sulphate (anhydrite) must be added to prevent flash setting.

Treatment media were made with Alborg white cement clinker and Alborg White OPC. Alborg white clinker is made using an extremely pure limestone originating from a marine deposit which is now located in Denmark and was obtained from Aalborg Portland A/S—Denmark, Aalborg Portland A/S, Rørdalsvej 44, P.O. Box 165, 9100 Aalborg, Denmark.

The unmilled clinker was obtained from Hanson Cement, Ketton Works Ketton, Stamford, Lincolnshire.

As an alternative to using a mixture of OPC and clinker, the man skilled in the art will readily appreciate that it is possible to make the treatment medium of the invention using either OPC alone or clinker alone, OPC alone being preferred because of its ready availability and ease of handling compared to clinker. Where clinker alone is used in place of a mixture of OPC and clinker then calcium sulphate (anhydrite) must be added to prevent flash setting.

A typical composition of the Alborg clinker used is:—
$SiO_2$ 25.0%
$Al_2O_3$ 2.00%
$Fe_2O_3$ 0.30%
CaO 69.0

This gives a calculated Bogue composition as follows:—
$C_3S$ 65.0%
$C_2S$ 21.0%
$C_3A$ 5.0%
$C_4AF$ 1.0%
$CaSO_4$ 0%

The equivalent typical figures for the OPC used in this experiment were:—
$SO_3$ 2.03%
$SiO_2$ 24.4%
$A_{12}O_3$ 1.97%
$Fe_2O_3$ 0.34%
CaO 68.6%
MgO 0.58%
Cl 0.01%
$TiO_2$ 0.09%
$P_2O_5$ 0.30%
$K_2O$ 0.16%
$Na_2O$ 0.19%

Thus giving a calculated Bogue composition (corrected to take into account a free lime content of about 3%):
$C_3S$ 66.04%
$C_2S$ 20.1%
$C_3A$ 4.64%
$C_4AF$ 1.04%
$CaSO_4$ 3.45%

Importantly the clinker has a very low free iron content which is important as iron is a powerful pro-oxidant trace metal, (see for example Sonntag 1979 in Bailey's industrial Oil and fat Products, New York, John Wiley and Sons, Vol 1. pp 152).

The clinker was milled by an external ball-miller to a "ready-to-use" grain-size of nominally 14.5 µm, with the particle size distribution being such that the d50 was 13.33 µm±4.7%, which was approximately the same size as the cement used. Once milled the clinker was kept in a dry sealed plastic container to prevent clumping, until use.

Both the clinker and the cement were fine sieved immediately prior to mixing to remove any large clumps before the addition of the water. The addition of deionised water is preferred but this is not essential to a satisfactory embodiment of the invention disclosed herein.

The mix to make the filters comprised three parts of clinker to one part of OPC as well as relatively minor amounts of microsilica (12% by weight of the paste) and a small amount of Microair 119, an air entraining agent manufactured by BASF, added in accordance with user instructions.

For many years entrained air has been deliberately incorporated into concrete and cement mixtures in parts of the world which experience freezing so as to reduce the damage caused by repeated cycles of freezing and thawing. Chemical additives, known as air entraining agents, are used to produce a stable system of discrete air voids, which are typically extremely small being between 10 µm and 1 mm. There are normally more than 1 million such bubbles in one cubic inch of treated paste or more than 60,000 per cubic centimeter. The entrained air void system in cement can be viewed and determined from the examination of a cut and polished section of a hardened cement sample, using microscopic techniques in accordance with ASTM C457 (standard test method for microscopical determination parameters of the air void system in hardened concrete).

Such air voids provide empty spaces within the cement or concrete and are known to act as storage sites for freezing water moving in the capillary pores, thereby relieving the pressure generated during freezing and preventing damage to the cement or concrete. The addition of relatively small amounts of air entraining agents to mixtures of the type used to make the filters of the type described in the BBM Patents produces very much more porous filters, which absorb very considerably much more free fatty acids and aldehydes than filters without such air entraining agents. There are a number of well-known types of air entraining agents.

Typically these are surfactants and include for example wood derived acid salts, wood rosin, tall oil, vegetable oil acid salts such as the alkanolamine salt of coconut oil, synthetic detergents such as alkyl-aryle sulfonates and sulfates such as dodecylbenzenesulfonate. The surfactant used in the invention disclosed herein must be non-toxic. The man skilled in the art will readily be able to identify numerous such non-toxic air entraining agents suitable for use in the invention herein described.

Thorough mixing of the clinker, the OPC, the air entraining agent and the microsilica, using an industrial mixer took place and then sufficient water was added to give a good paste in accordance with the following mix design:—

| | | |
|---|---|---|
| WHITE CEMENT | Kg | 0.900 |
| CLINKER | Kg | 2.700 |
| DEIONISED WATER | Kg | 1.800 |
| ANHYDRITE | Kg | 0.054 |
| MICROSILICA | Kg | 0.400 |
| Microair 119 | ml | 24.000 |
| | Dry Total | 4.05 |

Assuming about 10% of the mix was wasted in the mixer and in the moulds this 4.05 kg of mix would typically produce about 15 treatment blocks, each with a weight before drying of 240 gms.

The paste was then placed into moulds, of the type depicted in FIGS. 1 to 4 of WO/2013/121206 and as further described in that patent application and left to cure for 24 hours at room temperature in curing chambers (essentially closed boxes) where the relative humidity was kept near 100%. After 24 hours the paste was found to be fully set and capable of easy demoulding by manipulation of the flexible sidewalls of the moulds.

The dimensions of the filters were approximately 15 cm×2 cm×9 cm with 30 holes each with a diameter of approximately 0.5 cm: (these figures ignore slight tapering of the filter to facilitate extraction from the mould).

Drying

Thereafter the demoulded treatment blocks were dried in an industrial oven for at least 18 hours and more preferably for at least 24 hours at a temperature of at least 200° C. and most preferably 230° C. This prolonged drying at an elevated temperature has surprisingly been found to be essential to produce a filter that does not foam in use. The drying at such elevated temperatures for at least 18 hours and more preferably for at least 24 hours was such so that the weight of the filters did not appreciably further reduce after 18 hours no matter how much longer the filters were dried at this temperature and typical figures are given below in table 4. The weights shown are average weights for ten treatment blocks.

| Start Weight | Temperature | Time | End weight |
|---|---|---|---|
| 235 gm | 130° C. | 6 hours | 226 gm |
| 235 gm | 130° C. | 12 hours | 220 gm |
| 234 gm | 130° C. | 24 hours | 217 gm |
| 236 gms | 230° C. | 6 hours | 226 gm |
| 233 gm | 230° C. | 12 hours | 218 gm |
| 233 gm | 230° C. | 18 hours | 212 gm |
| 235 gm | 230° C. | 24 hours | 210 gm |
| 234 gm | 230° C. | 48 hours | 209 gm |
| 236 gm | 230° C. | 72 hours | 211 gm |

This prolonged drying at elevated temperatures was found to be an essential step to reduce foaming as further described herein below. Without wishing to be bound by any theory, it is believed that the prolonged drying at these temperatures evaporated off water in the pores in the cement and further led to the losses of some water of hydration within the cement minerals. Such water emanating from the cementious material can be expected to contain substantial amounts of dissolved calcium hydroxide and calcium ions, which on coming into contact with hot cooking oil and breakdown products such as fatty acids are highly likely to make calcium fatty acid salts (soaps), thus leading to the formation of an impermeable layer on top of the oil which causes foaming during cooking.

The filters after drying were left in the oven to cool down and once they were sufficiently cool they were taken out of the oven and immediately individually wrapped with impermeable to water plastics packaging material to prevent any water absorption by them.

Porosity

The porosity of hardened cement paste is discussed e.g. by Alford et al. in their article entitled "An assessment of porosity and pore sizes in hardened cement pastes", J. Materials Sci., 16, (1981) 3105-3114. The porosity of a cementious article can be estimated by firstly weighing the article after it has been dried in an industrial oven (to give weight A) and then immersing it in water at room temperature until the article is fully saturated with water and then weighing it fully saturated (weight B). The total weight of the water taken up is then weight B minus weight A, which when multiplied by the density of the cement/density of water gives a figure which as a percentage of weight A represents the porosity of the filter.

The filters made for the purposes of this example had a porosity determined in accordance with the above described method of between 45 to 50%.

Frying Trials

Forty sets of trial frying runs were undertaken without any foraminous enclosures being used. 20 of the frying trials were carried out in an 18 L electric fryer and 20 of them were carried out in a 20 L gas fryer. 10 frying trials were carried out using Treatment Briquettes A and 10 frying trials were carried out using Treatment Briquettes B. Treatment Briquettes A were made according to the specification set out above save that they were dried at 130° C. for 6 hours whereas Treatment Briquettes B were made in the same way but were dried at 230° C. for 24 hours. Each frying trial comprised frying 10 lots of 900 gms of frozen pre-fried chips per day for five consecutive days: i.e. 45 kilograms of chips were cooked during each of the 40 frying trial.

Effect on Foaming

The results are tabulated below in tables 5 & 6.

TABLE 5

Treatment Briquettes A

| Energy source for fryer | Foaming trials | Non-foaming trials | % of establishments with this energy source which don't foam | % of establishments with this energy source which foam |
|---|---|---|---|---|
| Electricity | 2 | 8 | 80% | 20% |
| Gas | 4 | 6 | 60% | 40% |
| Total | 6 | 14 | 70% | 30% |

TABLE 6

Treatment Briquettes B

| Energy source for fryer | Foaming trials | Non-foaming trials | % of establishments with this energy source which don't foam | % of establishments with this energy source which foam |
|---|---|---|---|---|
| Electricity | 0 | 10 | 100% | 0% |
| Gas | 0 | 10 | 100% | 0% |
| Total | 0 | 20 | 100% | 0% |

It will be noted that with Treatment Briquettes B there was not a single instance of foaming in either the electric or the gas fryer. It will be observed that with Treatment Briquettes A the overall foaming rate was 30% whereas with treatment briquettes B the overall foaming rate was 0%. Thus it can be seen that the elevated temperature drying for a longer period of time completely eradicated foaming, even in the gas fryer.

Purification Performance of the Treatment Briquettes

Oils develop acidity during frying due to oxidation, hydrolysis and other decomposition routes. Different oils have different oxidation and hydrolysis rates. The free fatty acid level in any given oil in a fryer is determined by the starting FFA level, the subsequent rate of FFA generation and the amount of its elimination by distillation and absorption by food. It is essential therefore if meaningful data on FFA levels are to be obtained to use the same oil throughout all experiments. The trials described herein were all conducted with vegetable oil from the same manufacturer's (KTC) batch, which contains E900—a PDMS anti-foaming agent.

Two sets of trial frying runs were undertaken: one set with Treatment Briquettes A and one set with Treatment Briquettes B. An electric fryer was used for these frying trials. 10 lots of 900 gms of frozen pre-fried chips were fried each day for five days. At the end of each day a sample of the oil was collected. The samples were flushed with nitrogen and kept at minus 20° C. away from any source of light until analysed so as to prevent further breakdown of the oil.

The free fatty acid was measured for each sample using a titration procedure (AOCS method Ca 5a-40, IUPAC 2.201, AOAC 940.28 and see IUPAC (1979), Standard Methods for Oils, Fats and Derivatives, 6$^{th}$ edn, Pergamon Press, Oxford, reference 2) and the averaged results (expressed as percentages) are tabulated below:—

| Day | FFA % treatment briquettes A | FFA % treatment briquettes B |
| --- | --- | --- |
| 0 | 0.04 | 0.04 |
| 1 | 0.32 | 0.34 |
| 2 | 0.37 | 0.38 |
| 3 | 0.37 | 0.39 |
| 4 | 0.41 | 0.43 |

Thus it can be seen that the use of Treatment Briquettes B gave a performance in terms of ffa reduction which was substantially identical to that obtained from the standard filter, which had been dried at 130 degrees for only 6 hours.

Total Polar Compounds

Some authors and experts in the field have questioned how reliable free fatty acid concentration is as a measure of oil quality, (see for example effective Process Control in Frying by GB Quaglia et al at page 237 of Frying, Improving quality, edited by J. B. Rossell, Woodhead Publishing Limited). Accordingly the amount of total polar compounds was also measured as it is (along with acid value) a very commonly used indicator of oil quality and is widely used in many international regulations: (see for example Fritch, C. W. 1981. Measurements of frying fat deterioration. A brief review. J. Am. Oil Chem Coc. 58: 272-274 and Firestone, D. 2007. Regulation of frying fat and oil, In "Deep Frying: Chemistry, Nutrition, and Practical Applications". 2$^{nd}$ ed. Pp. 373-385. Erickson, M. D. ed. AOCS Press, Urbaba, USA.)

The content of total polar compounds in oil can be determined by the use of the methods set out in AOCS Cd_20-91 and ISO 8420. Typically a glass column (for example 35 cm in length and 2.1 cm in diameter) is used to effect the chromatography. A suitable eluent is a mixture of petroleum and diehthyl ether in the ration of 87:13 (v/v). The oil sample to be tested (2.5 g) is loaded into the packed column and the non-polar compounds (%) is calculated as the mass fraction of the total polar compounds in the oil sample as a percentage.

However the AOCS Cd_20-91 and ISO 8420 procedures need to be carried out in a laboratory with proper equipment by a skilled technician and is not suitable for on site testing. Accordingly we used a Testo 270 Deep frying oil tester (Testo Inc. Germany), which gives a more or less instantaneous reading of total polar compounds as a percentage when its probe is put into the oil to be tested and used in accordance with the manufacturer's instructions. The oil to be tested was tested at 55° C.

The oil samples collected for the previously referred to FFA testing (see above) were analysed using the Testo 270 and the results are tabulated below:—

| Day | TPC % Treatment Briquettes A | TPC % Treatment Briquettes B |
| --- | --- | --- |
| 0 | 5.0 | 5.2 |
| 1 | 7.7 | 8.4 |
| 2 | 9.6 | 10.5 |
| 3 | 11.4 | 11.2 |
| 4 | 15.0 | 16.8 |

Thus it can be seen that the total polar compound concentration was comparable as between the oil treated with Treatment Briquette A (130° C./6 hours) and the oil treated with Treatment Briquette B (230° C./24 hours).

Aldehydes

The aldehyde concentration of the oil was also ascertained as described below. Aldehydes are a good indicator of oil quality for several reasons. Firstly aldehydes, even in very low concentrations, are known to cause many of the off-flavours observed in used cooking oils and in food fried in such cooking oils. Secondly such aldehydes are secondary oxidation products, resulting from the breakdown of primary oxidation products and therefore can be seen as a good proxy for the concentration of such primary oxidation products.

Thirdly many aldehydes are considered to be injurious to human health, (see for example Warning: thermally-stressed polyunsaturates are damaging to health, Martin Grootveld, Christopher J. L. Silwood and Andrew W. D. Claxson Food Chemistry 67 (1999) 211-213). During frying, polyunsaturated fatty acids oxidize and form degradation products with proven toxicity, such as 4-hydroxy-2-(E)-nonenal: (see for example Seppanen C M, Csallany A S (2001) Simultaneous Determination of Lipophilic Aldehydes by High-Performance Liquid Chromatography in Vegetable Oil. J Am Oil).

Particular aldehydes of interest include:—
(a) trans-2-alkenals
(b) trans,trans-alka-2,4-dienals,
(c) 4,5-epoxy-trans-2-alkenals
(d) 4-hydroxy-trans-2-alkenals
(e) cis,trans-alka-2,4-dienals and
(f) n-alkanals.

Oil samples collected from the previous FFA testing were analysed and detection and measurement of the concentrations of such aldehydes was determined in accordance with the methodology as set out on pages 22 to 23 of WO 2008/015481 A2, which is incorporated by reference herein and the results are tabulated below as between (a) the oil exposed to Treatment Briquettes A and (b) the oil exposed to Treatment Briquette B. 50 gm samples of the oil were taken, after the oil had cooled and been filtered using the fryers own internal particulate filter. The samples were then flushed with nitrogen and kept at minus 20° C. away from any source of light until analysed so as to prevent further breakdown of the oil. The results are tabulated below:—

| 4 Days | trans-2-Alkenal | trans,trans-alka-2,4-dienal | 4,5-epoxy-trans-2-alkenal | 4-OH-trans-2-alkenal | cis,trans-alka-2,4-dienal | n-alkanal |
|---|---|---|---|---|---|---|
| Treatment briquettes A | 8.8 | 22.4 | 7.0 | 2.5 | 2.0 | 3.3 |
| Treatment briquettes B | 10.8 | 24.2 | 2.3 | 1.6 | 2.7 | 3.1 |

All units are mmol/kg oil detected in $^1$HMR experiments conducted on sunflower oil.

Again the results as between the oil treated with Treatment Briquette A and Treatment Briquette B were broadly comparable, showing that elevated drying did not affect the performance of the filters.

Reduced Usage of Anti-Foaming Agent

The use of the invention described herein enables a reduced amount of anti-foaming agent to be used. A very commonly used anti-foaming agent used in cooking oil is PDMS—polydimethylsiloxane. According to the World Health Organization, the acceptable daily intake of PDMS is up to 1.5 mg/kg of body weight (INCHEM International Program on Chemical Safety, http://www.inchem.org/documents/jecfa/jeceval/jec_1943. htm) and the maximum allowed in foods by the FDA is 10 ppm (Food and Drug Administration, 21 CFR Part 173.340 Secondary Direct Food Additives Permitted in Food for Human Consumption. Defoaming Agents, http://www.accessdatalda.gov/scripts/cdrh/cfdocs/cfcfr/CFRSearch.cfm?fr=173.340). The amount of PDMS absorbed in fried potato chips increased exponentially with increasing PDMS contents in the frying oil (Freeman I P, Padley F B, Sheppard W L (1973) Use of Silicones in Frying Oils. J Am Oil Chem Soc 50:101-103). It is therefore advantageous to reduce the amount of PDMS used in cooking oil as much as possible. PDMS is typically used in frying oils in concentrations of ~5 ppm in the oil.

Twenty sets of trial frying runs were undertaken: one set with Treatment Briquette A and one set with Treatment Briquette B. A 20 L gas fryer was used for these frying trials, with two filters used per fryer. For each set of trials, 10 lots of 900 gms of frozen pre-fried chips were fried each day for five days. The oil used was rapeseed oil which contained 5 ppm of PDMS for one series of frying runs and 10 ppm of PDMS for the other set of frying runs.

|  | Rapeseed oil with 5 ppm PDMS | Rapeseed oil with 15 ppm PDMS |
|---|---|---|
| Treatment Briquettes A | 2/5 | 0/5 |
| Treatment Briquettes B | 0/5 | 0/5 |

It can be seen that with Treatment Briquettes A at a standard concentration of 5 ppm PDMS, two of five of the frying runs experienced foaming whereas at 15 ppm PDMS there were no instances of foaming. With Treatment Briquettes B there was no foaming in any of the five trials even at the standard PDMS dosage of 5 ppm. Thus it can be seen that the use of the filters made in accordance with the inventions herein disclosed enables a reduction in the amount of PDMS required to successfully and consistently suppress foaming.

The invention claimed is:

1. A method for preserving cooking oil, comprising the steps of:
   hydraulically hardening an oil-permeable cementious material from a paste comprising greater than 50 wt % of a member selected from the group consisting of white ordinary Portland cement clinker, white ordinary Portland cement and a combination thereof, wherein said oil-permeable cementious material has a porosity of 30%-55%;
   manufacturing said oil-permeable cementious material via drying at a temperature of at least 230° C. and formed as stand-alone blocks, pellets, granules or balls; and,
   contacting cooking oil with said oil-permeable cementious material following said step of hydraulically hardening said oil-permeable cementious material from said paste.

2. The method for preserving cooking oil according to claim 1, wherein said paste further includes ingredients selected from the group consisting of silica, titania, lime, calcium sulphate, hydrated alumina, natural feldspars, diatomaceous earth, sodium zeolites, calcium zeolites, a clay and a combination thereof.

3. The method for preserving cooking oil according to claim 2, wherein said silica is a silicate mineral selected from the group consisting of calcium silicate, magnesium silicate, aluminum silicate, agalmatolite, an amphibole, attapulgite, a porphyry, kaolinite, rhyolite, talc, wollastonite and a combination thereof.

4. The method for preserving cooking oil according to claim 3, wherein said porphyry is granite porphyry.

5. The method for preserving cooking oil according to claim 2, wherein said silica is at least 5% by weight of microsilica.

6. The method for preserving cooking oil according to claim 2, wherein said clay is a member selected from the group consisting of a pillared clay, an activated clay/earth and a combination thereof.

7. The method for preserving cooking oil according to claim 1, wherein said paste further includes anhydrite.

8. The method for preserving cooking oil according to claim 1, wherein said paste further includes a non-toxic air entraining agent.

9. The method for preserving cooking oil according to claim 1, wherein the drying during said step of manufacturing said oil-permeable cementious material occurs for at least 18 hours.

10. The method for preserving cooking oil according to claim 9, wherein the drying during said step of manufacturing said oil-permeable cementious material occurs for at least 24 hours.

11. A composition for preserving cooking oil, comprising:
    an oil-permeable cementious material is hydraulically hardened from a paste and formed as stand-alone blocks, pellets, granules or balls and is subjected during manufacture to drying at a temperature of at least 230° C. for reducing foaming occurring in the cooking oil during preservation of the cooking oil during treatment with said oil-permeable cementious material, said oil-permeable cementious material having been hydraulically hardened from said paste comprising greater than 50 wt % of a member selected from the group consisting of white ordinary Portland cement clinker, white ordinary Portland cement and a combination thereof, said oil-permeable cementious material and having a porosity of 30%-55%.

12. The composition for preserving cooking oil according to claim 11, wherein said paste further includes ingredients selected from the group consisting of silica, titania, lime, calcium sulphate, hydrated alumina, natural feldspars, diatomaceous earth, sodium zeolites, calcium zeolites, a clay and a combination thereof.

13. The composition for preserving cooking oil according to claim 12, wherein said silica is a silicate mineral selected from the group consisting of calcium silicate, magnesium silicate, aluminum silicate, agalmatolite, an amphibole, attapulgite, a porphyry, kaolinite, rhyolite, talc, wollastonite and a combination thereof.

14. The composition for preserving cooking oil according to claim 13, wherein said porphyty is granite porphyry.

15. The composition for preserving cooking oil according to claim 12, wherein said silica is at least 5% by weight of microsilica.

16. The composition for preserving cooking oil according to claim 12, wherein said clay is a member selected from the group consisting of a pillared clay, an activated clay/earth and a combination thereof.

17. The composition for preserving cooking oil according to claim 11, wherein said paste further includes anhydrite.

18. The composition for preserving cooking oil according to claim 11, wherein said paste further includes a non-toxic air entraining agent.

19. The composition for preserving cooking oil according to claim 11, wherein the drying at a temperature of at least 230° C. of said oil-permeable cementious material during manufacture occurs for at least 18 hours.

20. The composition for preserving cooking oil according to claim 19, wherein the drying at a temperature of at least 230° C. of said oil-permeable cementious material during manufacture occurs for at least 24 hours.

* * * * *